(12) United States Patent
Deleval

(10) Patent No.: US 9,254,890 B2
(45) Date of Patent: Feb. 9, 2016

(54) POWER TRAIN FOR A PEDAL VEHICLE

(71) Applicant: E2 DRIVES SA, Louvain-la-Neuve (BE)

(72) Inventor: Arthur Deleval, Limelette (BE)

(73) Assignee: E2 DRIVES SA, Louvain-la-Neuve (BE)

( * ) Notice: Subject to any disclaimer, the term of this patent is extended or adjusted under 35 U.S.C. 154(b) by 0 days.

(21) Appl. No.: 14/397,460

(22) PCT Filed: Apr. 26, 2013

(86) PCT No.: PCT/EP2013/058816
§ 371 (c)(1),
(2) Date: Oct. 27, 2014

(87) PCT Pub. No.: WO2013/160477
PCT Pub. Date: Oct. 31, 2013

(65) Prior Publication Data
US 2015/0122565 A1  May 7, 2015

(30) Foreign Application Priority Data

Apr. 27, 2012  (BE) .................................. 2012/0284

(51) Int. Cl.
*B62M 11/14* (2006.01)
*B62M 6/55* (2010.01)
*B62M 6/50* (2010.01)

(52) U.S. Cl.
CPC ............... *B62M 11/145* (2013.01); *B62M 6/50* (2013.01); *B62M 6/55* (2013.01)

(58) Field of Classification Search
USPC ........................................................ 180/206.3
See application file for complete search history.

(56) References Cited

U.S. PATENT DOCUMENTS

| 6,053,833 | A  | * | 4/2000  | Masaki    | B60K 6/445  |
|           |    |   |         |           | 475/2       |
| 6,296,072 | B1 | * | 10/2001 | Turner    | B62M 6/55   |
|           |    |   |         |           | 180/206.2   |
| 2012/0010036 | A1 | * | 1/2012 | Moeller | B62M 6/45 |
|           |    |   |         |           | 475/149     |
| 2012/0247854 | A1 | * | 10/2012 | Kyoden | B62J 3/00 |
|           |    |   |         |           | 180/206.4   |
| 2014/0166385 | A1 | * | 6/2014 | Arimune | B62M 6/45 |
|           |    |   |         |           | 180/206.3   |
| 2015/0120119 | A1 | * | 4/2015 | Tauchi | B62M 6/55 |
|           |    |   |         |           | 701/22      |
| 2015/0136508 | A1 | * | 5/2015 | Strothmann | B62M 6/50 |
|           |    |   |         |           | 180/206.3   |
| 2015/0136509 | A1 | * | 5/2015 | Tanaka | B62M 6/50 |
|           |    |   |         |           | 180/206.3   |

FOREIGN PATENT DOCUMENTS

| EP | 0937600 A2      | 8/1999 |
| WO | WO 2010/092331 A1 | 8/2010 |

OTHER PUBLICATIONS

International Search Report (PCT/ISA/210) for PCT/EP2013/058816 mailed Sep. 12, 2013 and Written Opinion.

* cited by examiner

*Primary Examiner* — Kevin Hurley
(74) *Attorney, Agent, or Firm* — Koppel, Patrick, Heybl & Phipott

(57) ABSTRACT

Motive power unit for a pedal vehicle, comprising a first and second motor, the latter being meshed on the bottom-bracket spindle and the first motor being connected to a sun gear, a planet holder being connected to an output sprocket of the motive power unit, which comprises a measuring element arranged to produce a measurement signal indicating a torque supplied by the first motor and a control unit producing a speed control signal to be supplied to the first motor and a torque control signal to be supplied to the second motor on the basis of the angular velocities of the motors.

17 Claims, 13 Drawing Sheets

POWER TRAIN FOR A PEDAL VEHICLE

The present invention concerns a motive power unit for a pedal vehicle, in particular a bicycle, said motive power unit comprising a first and second motor as well as an epicyclic train having a planet carrier and a sun gear, said first motor being connected to the epicyclic train, said motive power unit also comprising a bottom-bracket spindle on which a ring is mounted that forms a first input to the epicyclic train.

Such a motive power unit is known from patent application WO 2010/092331. The known motive power unit is used in an electrically assisted bicycle. Electrically assisted bicycles are bicycles that are propelled conjointly by human force and by the mechanical force produced by an electric drive. These bicycles are distinguished from an electric motor cycle by the fact that the electric drive provides power to the transmission only when the cyclist is pedaling. With the known motive power unit the bottom-bracket spindle drives the planet carrier of the epicyclic train. The second motor serves essentially to provide a generator for charging the battery and thus to increase the range.

One drawback of the known motive power unit is that the power of the assistance supplied is low despite the presence of two motors. This is because only one motor contributes to providing the user with assistance for pedaling.

The aim of the present invention is to produce a motive power unit that provides electrical assistance proportional to the pedaling torque (or pedaling power) to which both motors contribute.

To this end a motive power unit according to the invention is characterised in that the second motor is meshed on the bottom-bracket spindle and the first motor is connected to the sun gear, the planet holder being connected to an output sprocket of the motive power unit, said first and respectively second motors being provided with a first and respectively a second sensor arranged to measure the angular velocity of the motor with which it is associated, said first and second sensors being connected to a control unit to which there is also connected a third sensor arranged to measure the speed at which the bike is being propelled by a cyclist, said motive power unit comprising a measuring element arranged to produce a measurement signal indicating a torque supplied by the first motor, said control unit being arranged to produce a first and second control signal on the basis of the speeds measured by the sensors and predetermined set values as well as the measurement signal indicating the torque, said first control signal being a rotation-speed control signal that is supplied to the first motor, said second control signal being a torque-control signal that is supplied to the second motor. The second motor assists the pedaling movement of the cyclist since it is meshed on the bottom-bracket spindle. The sum of the power produced by the cyclist pedaling and the power of the second motor is transmitted via the ring to the first input of the epicyclic train. The first motor for its part is, via the sun gear, integral with the second input of the epicyclic train. The output sprocket, the one that normally drives a wheel via a chain, is integral with the output of the epicyclic train by means of the planet holder. The speed of the output sprocket is therefore a linear relationship of the speeds of the two inputs, namely the ring and planet gear, and its torque is directly related to the torque of the two inputs by the set values imposed. Thus the two motors help to support the cyclist when he is pedaling. In normal operation, the three independent parts of epicyclic train rotate in the same direction. This increases efficiency by limiting the friction forces of the bearings since these are proportional to the relative speed of the moving parts.

A first preferential embodiment of a motive power unit according to the invention is characterised in that the control unit comprises an input for receiving a gear ratio signal indicating a gear ratio selected by the cyclist from a predetermined number of gear ratios, said control unit being arranged to produce said first control signal also as a function of the gear ratio signal received. Thus the cyclist is offered a system for electronic change of the gear ratios, replacing the existing systems (derailleur chain or internal gear-change hub). The gear change is controlled electronically by means of the gear ratio signal. The gear change can therefore be done in two different ways: either a manual change (control on the handlebars) of the gear ratios, or automatic change of the ratios effected by the control unit. The present invention also offers the possibility of obtaining a continuously variable transmission (rather than discrete ratios). The present invention could then offer its user conjointly two ratio change modes: a manual mode with discrete ratios for those who prefer to remain more traditional and an automatic mode with continuous ratios thus putting the cyclist continuously on an optimum gear ratio (a ratio calculated from a 2D table between cyclist torque and running speed). This way is the more natural but this does not exclude a manual mode with continuous ratios (rotating handle) and an automatic mode with discrete ratios. In addition, this system affords ease of transmission since it is now possible to change ratios under torque, on the go and without any jolt.

A second preferential embodiment of a motive power unit according to the invention is characterised in that the control unit is arranged to produce a weighted signal obtained by multiplication of the measured angular velocity of the second motor with a gear ratio signal received weighted by a step-down ratio of the second motor, and to produce said first control signal by means of the weighted signal. The gear ratio signal can thus easily be taken into account.

The invention will now be described with the help of the drawings that illustrate preferential embodiments of a motive power unit according to the invention. In the figures:

FIG. 1 relates to a drawing of a bicycle equipped with the motive power unit according to the invention;

Figure 1:
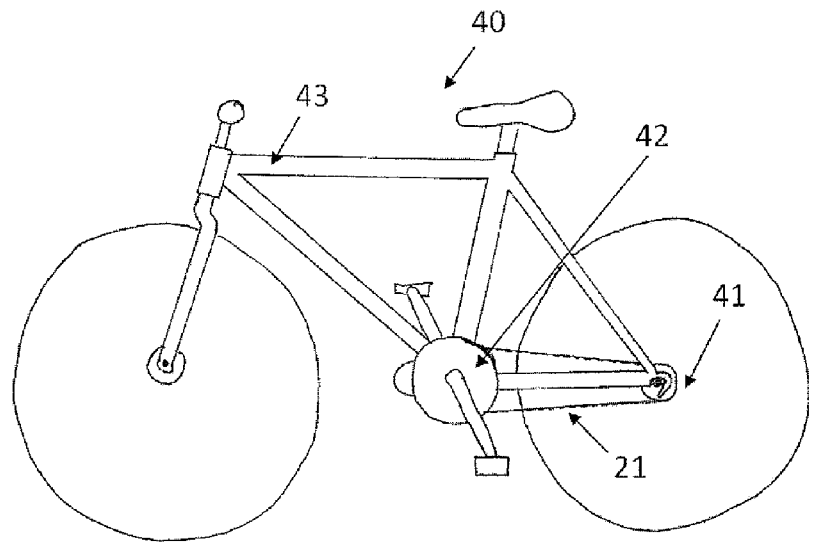

In the drawings the same reference has been attributed to the same element or to a similar element. The invention will be described for an application of the motive power unit to a bicycle. However, the invention is not limited to a bicycle and applies to any vehicle with pedals.

Figure 2:
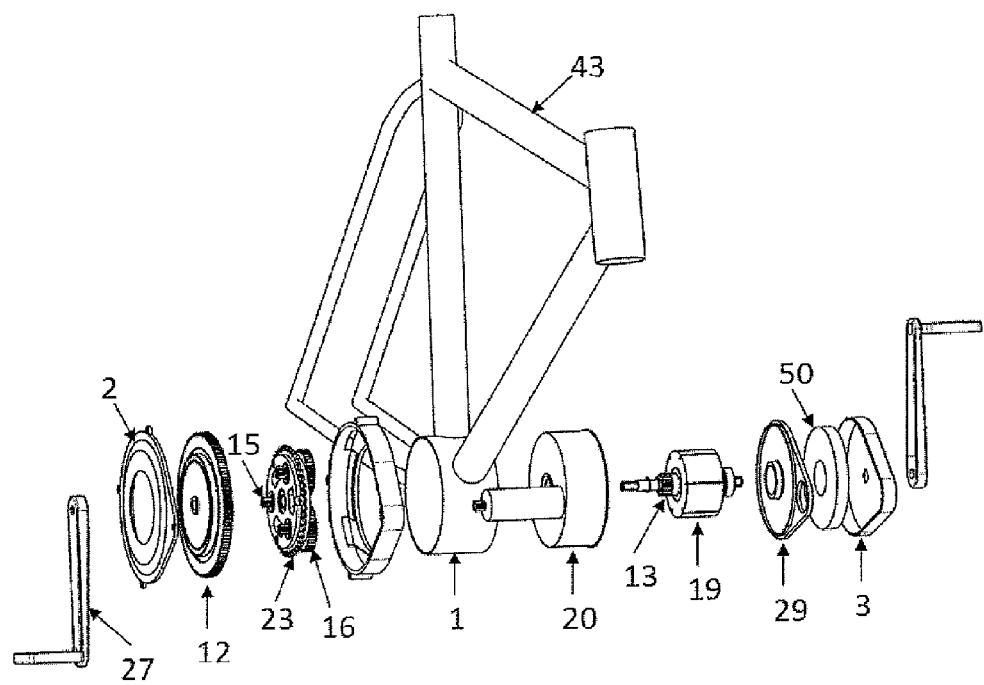
FIG. 2 illustrates an outline drawing of a bicycle consisting of bottom-bracket shell that can accept the motive power unit according to the invention.

FIG. 1 shows schematically a bicycle 40 equipped with the motive power unit according the invention. The bicycle comprises a frame 43 and a bottom bracket 27 as illustrated in more detail in FIG. 2. The frame comprises a bottom-bracket shell 1 having a diameter of between 15 and 20 cm, which is wider than on a conventional bicycle frame. This shell at least partially houses the motive power unit according to the invention. At the output from the motive power unit there is the output sprocket 23 that will drive the rear pinion of the wheel 41. The motive power unit proposed by the present invention is a central drive, that is to say situated at the bicycle bottom bracket, procuring for the bicycle a centre of gravity that is as low as possible, which improves the stability of the bicycle. The major part of the motive power unit is inserted as a cartridge in the shell 1 of the bicycle bottom bracket. In the example illustrated in FIG. 2 only one traction motor 4, forming part of the motive power unit, is housed outside the shell 1 of the bicycle bottom bracket.

Figure 3:
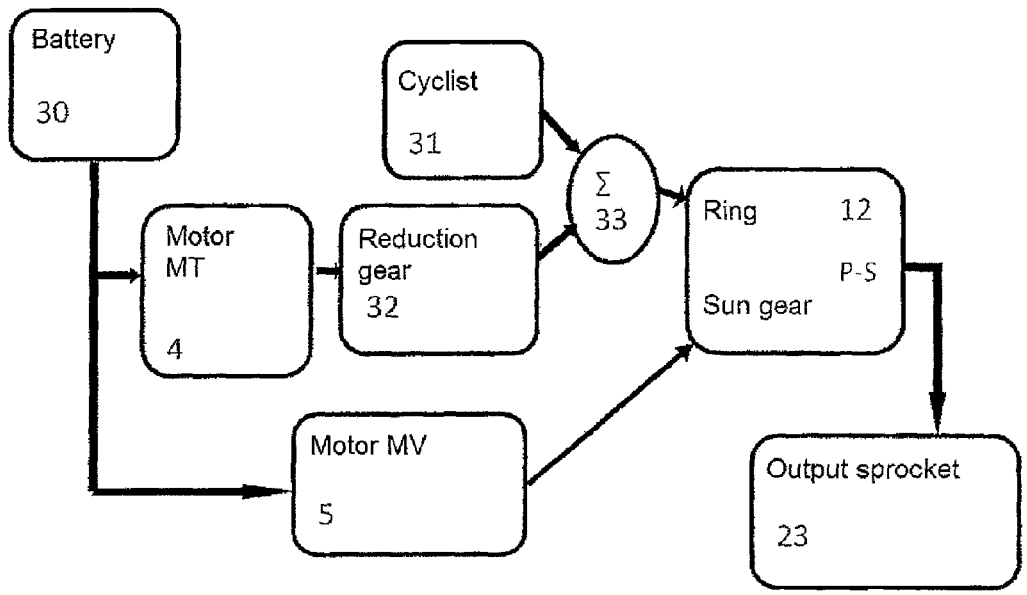
FIG. 3 shows schematically the power chain in normal operation of the motive power unit according to the present invention.
Figure 4:
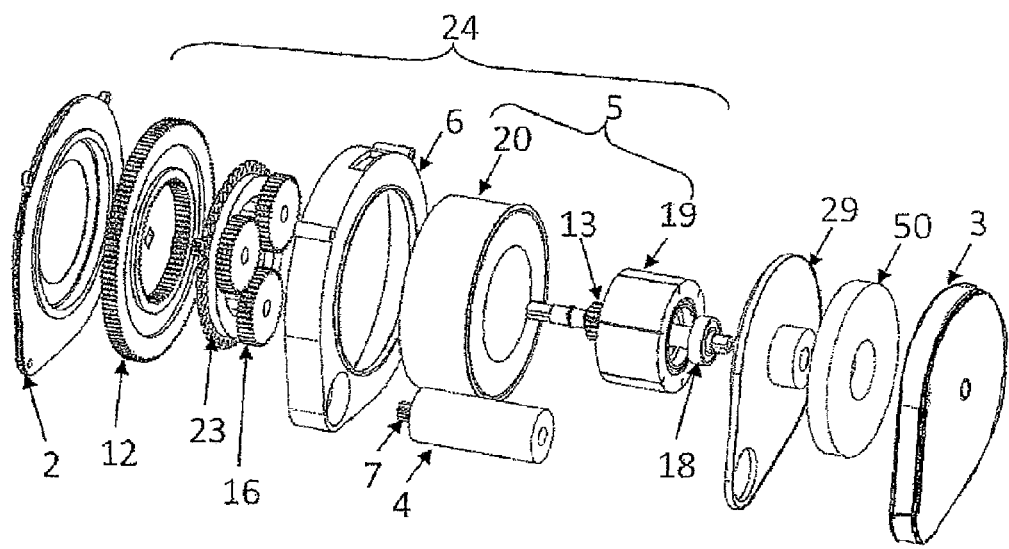
FIG. 4 illustrates an exploded view of the motive power unit according to the present invention.

As shown schematically in FIG. 3, the motive power unit comprises two electric motors:

A first so-called "variator" motor (denoted MV) 5 situated in the bottom-bracket shell A second so-called "traction" motor (denoted MT) 4 fixed outside the bottom-bracket shell.

The motive power unit is connected to a battery 30 that serves among other things to supply electric current to the motive power unit. The major part of the motive power unit is fixed inside the bottom-bracket shell 1. The traction motor 4 acts by means of a reduction gear 32 on the spindle of the bottom bracket. The latter is also driven by the cyclist 31. The traction provided by the traction motor and by the cyclist is added 33 and transmitted to the ring 12 of an epicyclic train 24, itself connected to the output sprocket 23.

Figure 5:
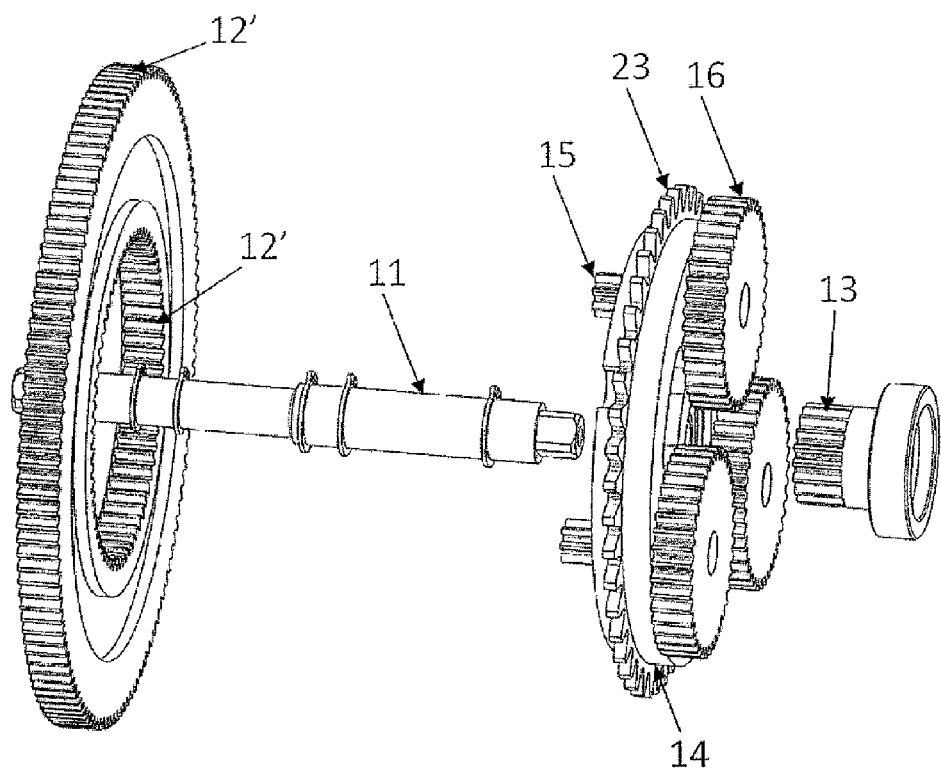
FIG. 5 illustrates the mounting of the epicyclic train and the output sprocket.
Figure 8:
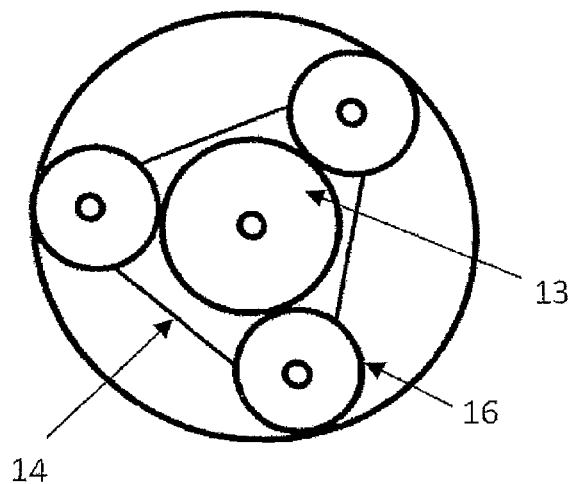
FIG. 8 illustrates the planet holder.

FIGS. 2 and 4 to 8 illustrate an embodiment of the motive power unit according to the invention. The motive power unit, with the exception of the second motor, is situated inside the bottom-bracket shell 1, which is then closed by two plates 2 and 3 also serving as a support for the traction motor 4. The first motor 5 comprises a stator 20 mounted coaxially with respect to a rotor 19. The wound stator 20 is fixed in the bottom-bracket shell. The first motor is connected to a sun gear 13 that forms part of an epicyclic train 24. The epicycle train is composed of three independent parts, namely the sun gear 13, the planet holder 14 and the ring 12. The planet gear preferably being mounted integrally with the rotor 19 of the first motor 5. The epicycle train also comprises a first set 15 of small planet gears and a second set 16 of large planet gears, as illustrated best in FIG. 5. Preferable each set of planet gears comprises three gear wheels, since this affords good balance between the moving parts and the weight of the epicycle train. Preferably the small and large planets of the first and second set of planets are on each occasion fixed to the same planet spindle 17. It should be noted that the small planets 15 and the large planets 16 are both integral with the planet spindle 17. The small and large planets of the first and second set of planets are mounted on either side of a planet carrier 14, as illustrated in FIGS. 5 and 8. The sun gear meshes with the large planets 16 in order to increase the speed of the planet holder 14. This is because the speed of the planet holder 14 is a linear relationship of the speeds of the ring 12 and the sun gear 13. The output sprocket 23 is mounted on the planet holder 14. The output sprocket being used to mount thereon a chain or toothed belt 21, which serves in its turn to drive the pinion of the rear wheel of the bicycle. The small planets of the first assembly 15 mesh with first teeth 12' provided inside the sprocket 12, itself forming part of the epicyclic train. Second teeth 12" of the sprocket mesh with the second motor 4, which is for this purpose provided with a drive pinion 7. The transmission between the drive pinion 7 and the sprocket is closed sealingly with the closure cover 6. The bottom-bracket spindle is preferably made integral with the sprocket 12 of the epicyclic train, for example by means of flutes, not shown in the drawing. Naturally other systems for rotational locking may be provided for fixing together the bottom-bracket spindle and the ring.

Figure 6:
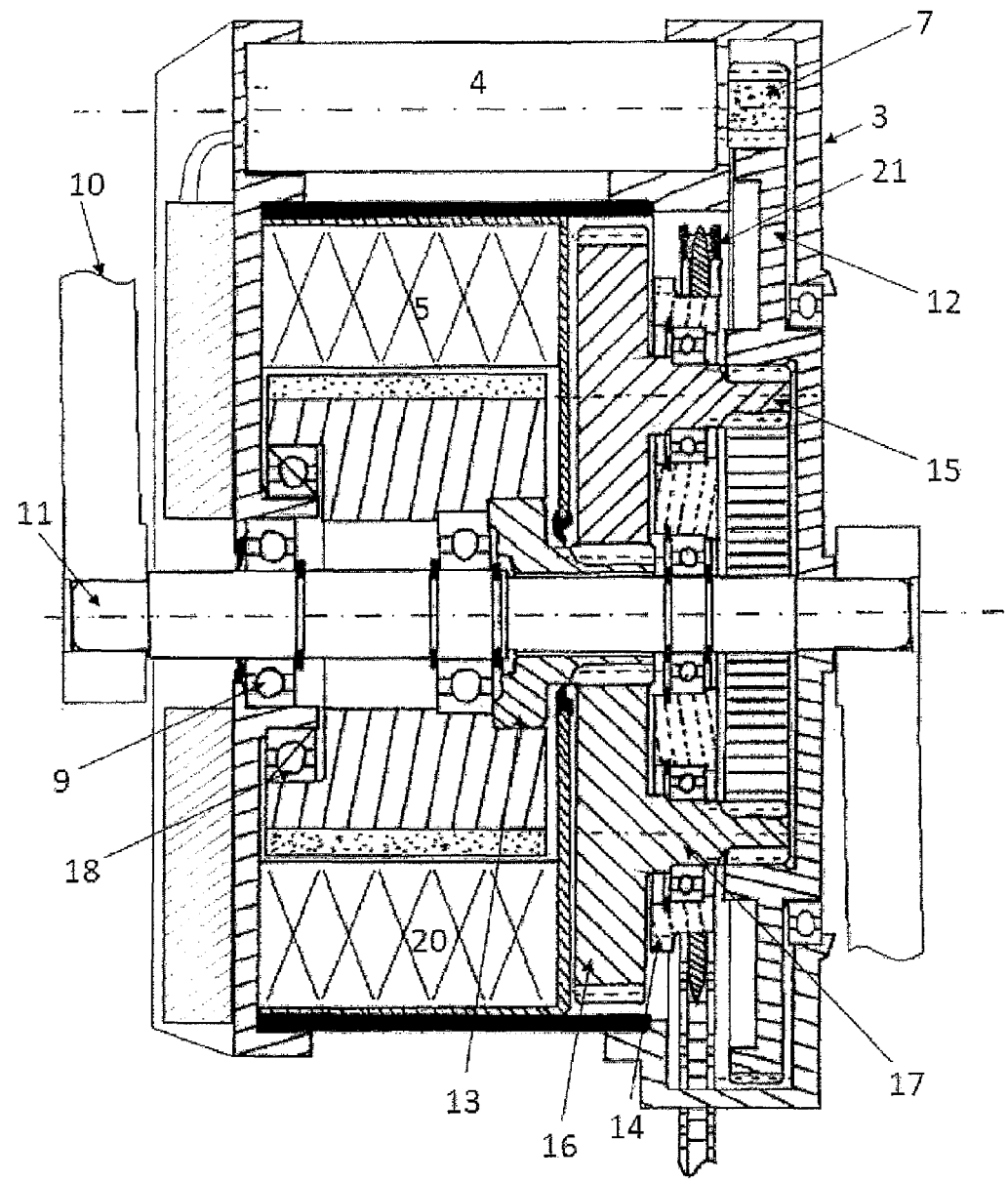
FIG. 6 shows a view in cross section of the motive power unit according to the present invention.
Figure 7:
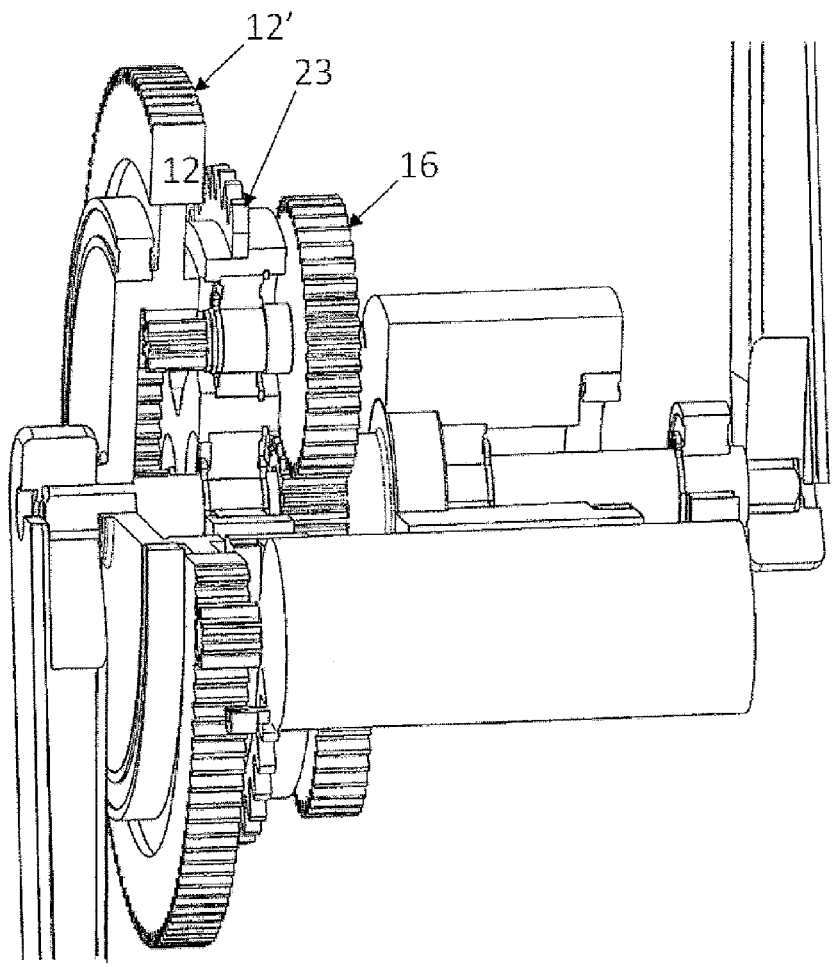
FIG. 7 illustrates the meshing of the epicyclic train and the bottom-bracket spindle.

A bottom-bracket spindle 11 passes through the epicyclic train and is supported by bearings 9 as illustrated in FIG. 6. The ring 12, which is connected to the bottom-bracket spindle, thus forms a first input of the epicyclic train. In normal operation the ring 12 drives the small planets 15, thus turning the planet holder 14 integral with the output sprocket 18. This output sprocket 18 drives the chain or the notched belt 21. A thin sealing wall 10 separates the epicyclic train from the variator motor 5. Several seals provide the seal between the variator motor 5 and the lubricated mechanical parts. Finally, the control unit is preferably housed in a housing 50 placed close to the motors in order to limit the cabling of electric wires. This housing is preferably circular in shape in order to match that of the bottom-bracket shell.

In normal operation the traction motor 4 assists the cyclist by driving the spindle of the bottom bracket 11 via two gears formed by the drive pinion 7 and the ring 12. This is because, as the pinion 7 of the second motor 4 is meshed on the teeth 12" of the ring, the rotation of the pinion driven by the second motor will rotate the ring. According to another embodiment (not illustrated) the pinion 7 may be in engagement with a reception wheel, which is mounted on the spindle of the bottom bracket. The combination of the torque supplied by the second motor 4 and the human force turns the ring 12. This arrangement is even more advantageous if the second motor 4 benefits, just like the cyclist, from a change in gear (of the variable transmission), thus working at better efficiency. The motive power unit according to the invention can function either with several gear ratios or with a single gear ratio.

Each motor has its function. The purpose of the variator motor is to continuously provide the transmission ratio that the control unit imposes on it, whatever the level of assistance (=ratio of the total electric power supplied to the human power supplied) and whatever the speed of travel. The transmission ratio depends in fact on the ratio of the speed of the variator motor 5 and that of the bottom bracket 27. This ratio is equivalent to the angular coefficient of the straight line representing the change in the speed of the variator motor as a function of the speed of the bottom bracket, as will be described in more detail below. It is therefore possible to remain on a constant transmission ratio while keeping this angular coefficient constant. To change ratio, the cyclist changes the value of this angular coefficient. The variator motor is therefore controlled for angular velocity in order to fulfil its function of speed variator. Naturally this motor also gives power in the transmission chain and therefore the whole of its power is found at the wheel, to within any friction of course. The rotor 19 of the first motor is mounted on a freewheel 18, itself mounted on the frame 29 in order to prevent the first variator motor from rotating in the opposite direction (the direction contrary to the predetermined direction of rotation of the bottom bracket). The function of this freewheel is to allow a purely mechanical power transmission to the wheel functioning in the event of rupture with any kind of supply of the motors. In the case of a motor breakdown, the cyclist can thus still pedal in order to get home. This operating mode corresponds to the smallest transmission ratio. During this mode the first variator motor is not supplied and the second traction motor can be supplied in order to assist the cyclist.

The traction motor 4 assists the movement of the cyclist by adding torque to the bottom bracket. During certain operating cases, this motor may also brake the pedal movement of the cyclist. Its role is in fact to continuously follow the level of assistance that the control unit imposes on it, whatever the transmission ratio "engaged" and whatever the running speed. This motor is controlled for torque.

The bicycle on which the motive power unit is mounted can also be equipped with a traditional freewheel in the rear pinion of the wheel preventing the chain (or belt) from turning when the bicycle continues to travel by virtue of its inertia. Another version (detailed below) will use a pinion fixed to the wheel without an intermediate freewheel, thus making it possible to brake on the variator motor and thus recharge the variator motor.

The control of the two motors will now be described in more detail. The torque to be supplied by the first motor 5 to the planet holder is imposed by the road law. It is controlled for speed in order to follow a transmission ratio set value. The speed of the second motor is imposed by the pedaling rate of the cyclist since it is kinematically connected by gears to another system of transmission to the ring. It will therefore be controlled for torque in order to assist the cyclist in his effort. The set speed value is a linear function of the pedaling speed, the multiplying coefficient depending on the gear ratio chosen by the cyclist or determined by the control unit according to the speed at which the cyclist is travelling. To this end the control unit comprises an input for receiving a gear ratio signal indicating a gear ratio selected by the cyclist from a predetermined number of gear ratios. When the gear change is automatic, the motive power unit comprises a third sensor connected to the control unit and arranged to measure the speed at which the bicycle is propelled by a cyclist. The control unit then being arranged to produce, on the basis of the measured speed, a gear ratio signal indicating a gear ratio selected from a predetermined number of gear ratios.

Another asset of the present motive power unit is its ability to be able to function in braking and thus recover the braking energy in order to recharge the battery if the freewheel initially installed on the wheel pinion is omitted. At this moment, if the bicycle is launched with a certain inertia or if it is running down a slope, the chain turns and drives the output sprocket of the motive power unit. As the output sprocket is connected to the planet holder, the latter now acts as a power differential. It will have a tendency to turn the variator motor (in its normal direction), which at this time will be controlled as a generator in order to brake the bicycle and thus transmit power to the battery. This system could for example be activated by back-pedaling, like the torpedo system. The power of the brake and therefore the quantity of energy supplied to the battery could be controlled according to the back-pedaling force that the cyclist is exerting.

On the smallest gear ratio, the first motor 5 is not supplied with electric current. Only the second motor participates in the electrical assistance. The sun gear is locked by virtue of the freewheel 18 connecting the frame (left-hand arrow (2)) to the rotor 19 of the first motor 5. To increase the transmission ratio, it is necessary to start the first motor 5. This then commences to participate in the global electrical assistance. The more the speed of the first motor is increased, the more the transmission ratio will be increased and the more this will participate in the global assistance.

Figure 9:
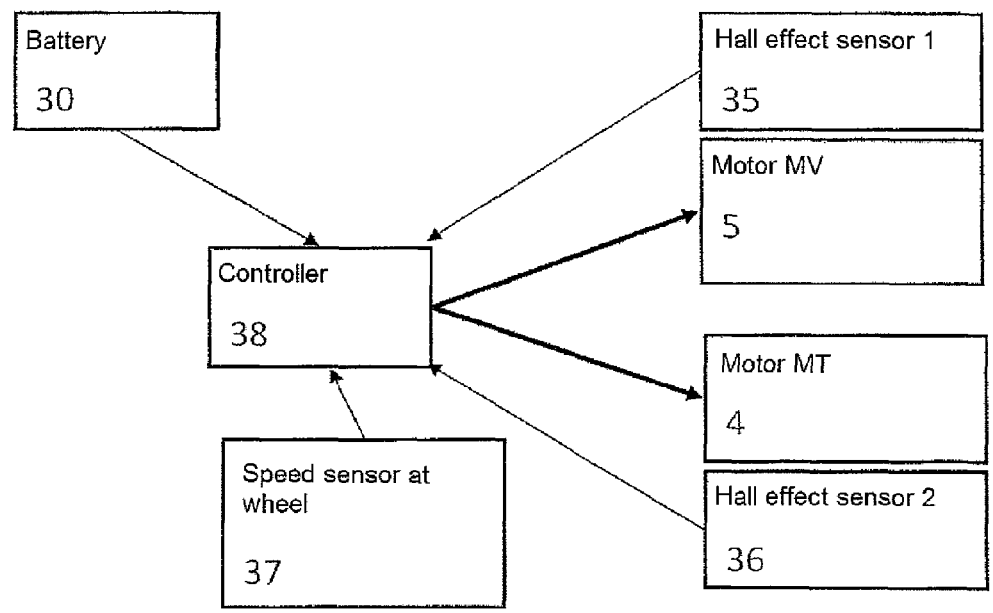
FIG. 9 shows a diagram depicting the various elements necessary for the control of the motors.

FIG. 9 illustrates schematically the electrical connection of the motors 4 and 5 and the control unit 38. Preferably each motor is equipped with a Hall effect sensor 35, 36 able to count up to six counts per rotor turn. The information from the sensors is sent to the control unit to be analysed. The control unit also calculates the current injected into each motor in order to calculate the torque on each motor (torque proportional to the intensity of the electric current). Finally, a sensor 37 of speed to the wheel is necessary to the control unit, if various gear ratios are available. To measure the torque imposed by the cyclist on the pedals, the control unit makes a calculation using the torque on the shaft of the two motors. This can easily be measured, since the torque is proportional to the current passing through the induction coils of the direct-current motor. When the cyclist accelerates, the control unit can calculate the speed of the bicycle from the speeds of the motors, for example with the kinematic equations of the epicyclic train. When the bicycle is freewheeling, the speed of the wheel is decoupled from the speed of the output sprocket and this speed sensor 37 is therefore necessary.

An understanding of the functioning of the motive power unit according to the invention requires having recourse to physics and it is for this reason that this physics will first of all be described. Since several abbreviations will be used, these abbreviations will first of all be defined in the table set out below':

| Notation | Designation | Unit |
| --- | --- | --- |
| $\omega_{plat}$ | angular velocity of the output sprocket | [rad/s] |
| $\omega$ MV | angular velocity of sun gear of first motor | [rad/s] |
| $\omega$ MT | angular velocity of second motor | [rad/s] |
| $\omega_{ped}$ | angular velocity of bottom bracket | [rad/s] |
| $\omega_R$ | angular velocity of rear wheel of bicycle | [rad/s] |
| $\omega_{pAR}$ | angular velocity of rear pinion | [rad/s] |
| $C_x$ | torque on element x | [N · m] |
| $P_x$ | power on element x | [W] |
| R | reduction ratio of an epicyclic train | [n.u.]* |
| $R_{trans}$ | reduction ratio of transmission | [n.u.]* |
| R second motor | reduction ratio of second motor | [n.u.]* |
| E | speed range | [%] |
| Demul | step down existing between pedalling speed and speed of rear wheel | [n.u.]* |
| NivAssist | level of electrical assistance | [n.u.]* |
| a | multiplying coefficient of speed of first wheel | [n.u.]* |
| Mes | means "measured" | / |
| Err | means "error" | / |
| Cons | means "set value" | / |

*(n.u.) = no unit

Initially and to facilitate understanding of the mathematical equations, the reasoning will be explained without the second so-called traction motor 4. It is the epicyclic claim that contributes to the main innovation of this novel drive. Taking the equations of the epicyclic train it will be noted that:

$$\omega_{plat} = \frac{\omega_{MVpl} + R\omega_{ped}}{R+1} \quad (1)$$

$$C_{MV} = \frac{C_{ped}}{R} = \frac{C_{plat}}{R+1} \quad (2)$$

with R defined by the dimensions of the elements of the double epicyclic train, that is to say with the small and large planets.

The speed of rotation $\omega_{plat}$ and the torque on the sprocket $C_{plat}$ are imposed by the running situation, which imposes $C_{MV}$ and $C_{ped}$ (by equation (2)). However, this leaves free choice for $\omega_{ped}$ and $\omega_{MV}$. The pedaling speed is in fact imposed by the cyclist, and this is situated between 30 and 90 rev/min on average according to the running conditions. This makes it possible to adjust the rotation speed in order to give the assistance but, where applicable, also to artificially change the gear ratio seen by the cyclist. According to equation (2), the pedaling torque is linked to that of the variator motor, which can easily be measured by measuring the current passing through the field winding. Thus the motive power unit according to the invention requires no pedaling torque sensor. This is a not insignificant advantage in terms of cost price of the mechanism since the torque sensors used in the other types of drive are complex and very expensive.

When the first motor 5 is powered down, the ring 12 of the epicyclic train, integral with the bottom-bracket spindle, drives the planets 6 and 15. The planet gear 13, connected to the frame of the bottom-bracket shell by a freewheel, is at this moment locked at a zero speed since it is not driven by the first motor. The planet holder 14 connected to the output sprocket 23 is therefore driven at the smallest step-down ratio, at a speed slightly less than the pedaling speed:

$$\omega_{plat} = \frac{R}{R+1} \cdot \omega_{ped}$$

To increase the step-down ratio, it is necessary to start up the first motor 5, which will then, via a freewheel, drive the sun gear 13 of the epicyclic train. This will now rotate at a speed greater than zero. The sprocket this time turns at a speed described by the following equation:

$$\omega_{plat} = \frac{\omega_{MV} + R\omega_{ped}}{R+1}$$

with $\omega_{MV} > \omega_{ped}$

The rotation speed $\omega_{MV}$ of the first motor will, according to the gear ratio engaged (electronic selector on the handlebars or any automatic mode), be equal to a coefficient a multiplied by the pedaling rotation speed $\omega_{ped}$. A demand to change ratio coming from the cyclist or the automatic controller will therefore have the effect of changing this coefficient a. The first motor 5 will therefore be regulated for speed by a regulation loop using the information from a sensor measuring the angular velocity of the bottom-bracket spindle. This functioning is validated by the definition of the step-down (a simplified term meaning the step-down ratio of the bicycle). This is because, by keeping a constant coefficient "a", the step-down also remains constant. By increasing the coefficient "a", the step-down increases.

With $\omega_{MV} = a \cdot \omega_{ped}$ and $a \in [0:val_{lim}]$, the following is easily obtained:

$$demul = \frac{\omega_R}{\omega_{ped}} = \frac{\omega_R}{\omega_{plat}} \frac{\omega_{plat}}{\omega_{ped}} = R_{trans} \cdot \frac{a+R}{R+1}$$

It should be noted that this artificial change of step-down seen by the cyclist imposes on the motive power unit a different level of assistance for each gear ratio engaged. Effectively, by making a power balance, it is possible to calculate the assistance level defined by the electric power divided by the human power.

$$P_{plat} = P_{ped} + P_{MV} = C_{ped} \cdot \omega_{ped} + C_{MV} \cdot \omega_{MV}$$

By changing $\omega_{MV}$ and $C_{MV}$ by the equations defined above, the following is easily obtained:

$$P_{plat} = \frac{a+R}{R} \cdot P_{ped}$$

The assistance level defined as the ratio between the electric power supplied to the total power supplied to the output sprocket. Here the definition is reduced to the following expression:

$$NivAssist = \frac{P_{MV}}{P_{plat}} = \frac{a}{a+R}$$

The assistance level therefore increases clearly with the rotation speed of the first motor. This means that, on small step-down ratios, the assistance level will be low and, for high step-down ratios, the assistance level will be at a maximum.

The motive power unit according to the invention also comprises the second motor 4. The second so-called traction motor has several advantageous roles. Its first role is obviously to obtain a degree of freedom in the control of this motive power unit in order to adapt the assistance level to any situation. The second motor is directly connected, via a step-down set of gears, to the bottom-bracket spindle so that it is now possible to increase the assistance level on low step-down ratios. The arrangement of this second motor 4 in the kinematic chain is advantageous since this motor, just like the cyclist, benefits from the step-down ratio, providing high torque in running situations requiring a great deal of effort, such as a steep slope or running on deformable ground. The assistance level defined as the ratio of the electrical energy to the total energy supplied to the output sprocket then becomes:

$$NivAssist = \frac{P_{MV} + P_{MT}}{P_{MV} + P_{MT} + P_{Homme}}$$

By modifying this expression with the equations established previously, the following result is obtained:

$$NivAssist = \frac{a + \frac{R_{MT} C_{MT}}{C_{MV}}}{a+R}$$

The second motor will therefore be controlled in closed loop with a set torque value affording a good assistance level, its speed of rotation being imposed by the pedaling speed via the step-down ratio dictated by the geometry of its transmission.

$$\omega_{MT} = R_{MT} \cdot \omega_{ped}$$

Being directly linked to the bottom bracket, without freewheel, this motor can also function in brake mode, affording in all cases total control of the assistance level. Functioning in generator mode, returning the energy thus created in the variator motor, is also envisaged in pure pedaling mode (no current coming from the battery) for running at a speed higher than the regulated speed. This way of proceeding will thus replace the addition of a second epicyclic train necessary to this function.

Finally, the speed of the rear wheel of the bicycle is mathematically linked to that of the output sprocket via a step-down ratio imposed by the geometry of the pinions. The equation for this transmission is:

$$\omega_R = R_{trans} \cdot \omega_{plat}$$

Figure 10:
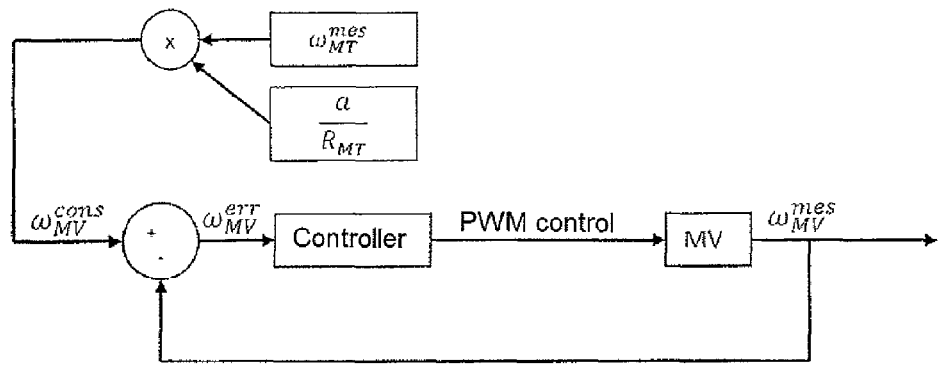
FIG. 10 shows the block diagram calculating the set speed value of the variator motor.

FIG. 10 shows the block diagram for calculating the set speed value of the variator motor. The measured angular velocity $\omega_{MT}$ of the second motor and the step-down coefficient a divided by the reduction ratio $R_{MT}$ of the second motor are multiplied together in order to form the set angular velocity $\omega_{MV}$ at the first motor. The control unit 38 is mounted in a regulation loop in order to ensure that the first motor is actually supplied so as to rotate at the set angular velocity. In order to keep a constant transmission ratio, it is necessary for the angular coefficient of the "speed of first motor—pedaling speed" straight line to be constant. The control unit therefore imposes on the variator motor a speed proportional to the pedaling speed on the same gear ratio. To vary the transmission ratio, it suffices to change the value of this angular coefficient denoted "a".

Figure 11:
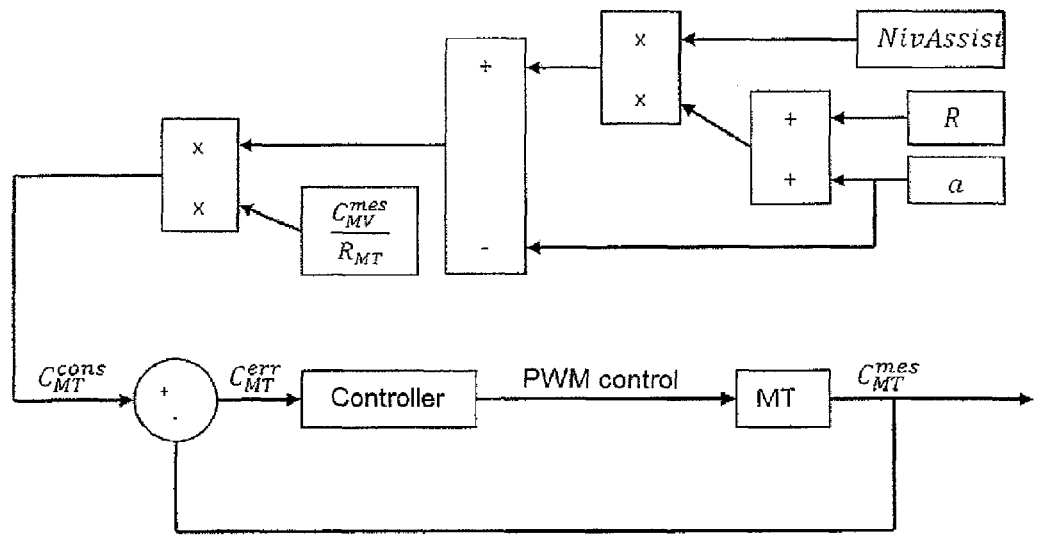
FIG. 11 illustrates the block diagram for calculating the set torque value to be imposed on the traction motor.

FIG. 11 illustrates the block diagram for calculating the set torque value to be imposed on the traction motor 4. This depends on the torque present on the rotor of the first motor 5. The set torque value of the second motor will also depend on the assistance level to be imposed on the cyclist. The reduction ratio of the epicyclic train R and the multiplying coefficient a are added so as then to be multiplied with the assistance level determined. Next the set torque value $C_{MT}$ is determined for the second motor from this assistance level determined and the measured torque of the first motor. A regulation loop is also provided for ensuring that the second motor supplies the torque determined by the torque of the set value.

Figure 12:
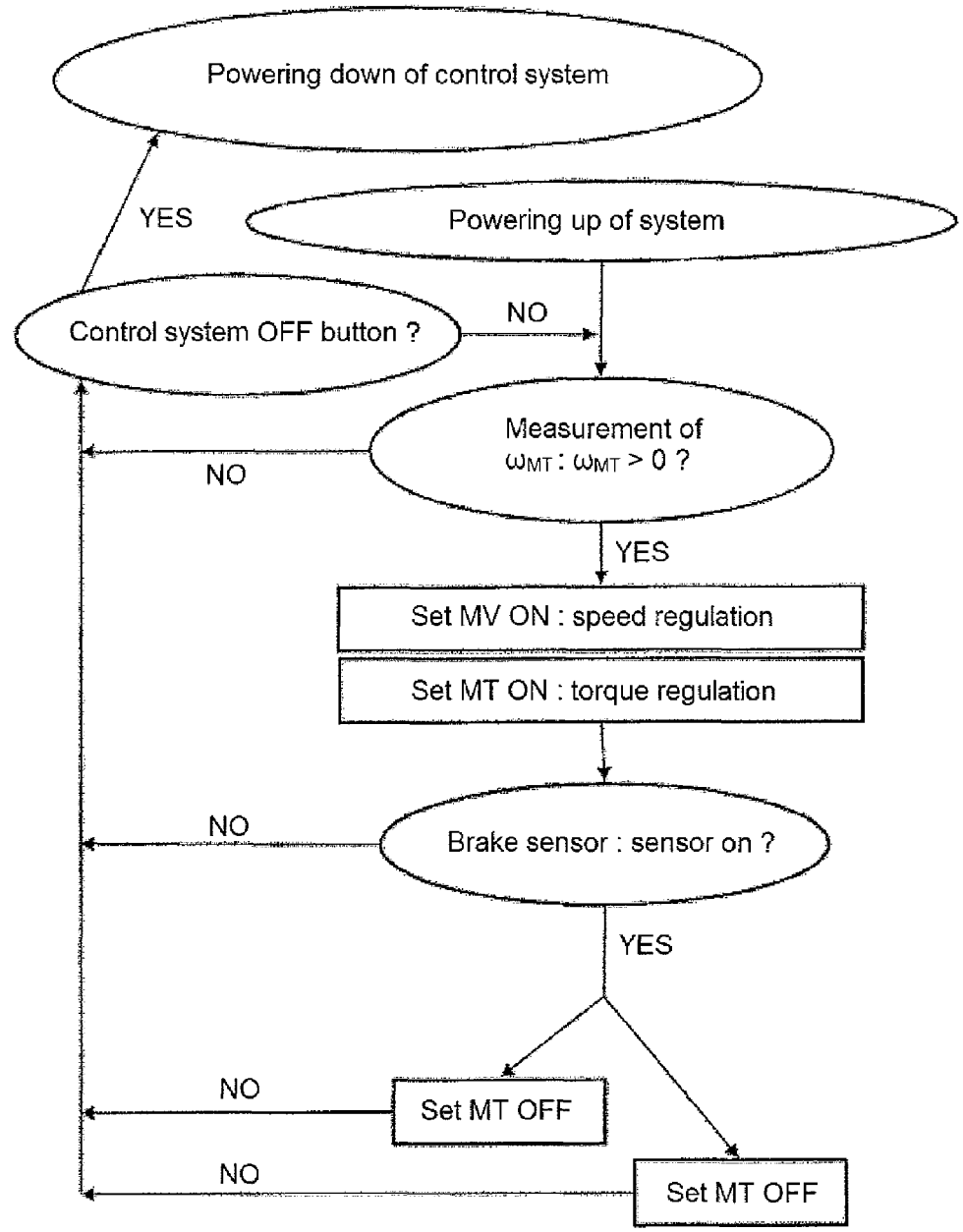
FIG. 12 illustrates, by means of a flow diagram, the control logic of the control unit.

FIG. 12 shows, by means of a flow diagram, the management performed by the control unit. When the motive power unit is powered up the angular velocity of the second motor is measured. If it is greater than zero the set speed value of the first motor and the set torque value of the second motor are determined. Preferably it is also checked whether the brake sensor is activated before supplying the set values to the motors.

As described previously, the correct functioning of the motive power unit is ensured at high speed as long as the first motor is rotating. However, some countries prohibit electrical assistance above a certain limit (25 km/h in Europe, 32 km/h in Canada). Which would mean that the variator motor should be powered down once the limit speed is reached, thus changing from a high gear ratio to the lowest ratio, and thus putting the cyclist in an uncomfortable situation if he wishes to pass this speed. In order to avoid this inconvenience, it is necessary to find a technical solution that makes it possible to keep a gear ratio close to that on which the cyclist was before exceeding the limit speed.

There are three possible solutions in the face of this problem:

1. Keep the mechanism simple and therefore cut off the two motors. The cyclist is forced to go to the lowest gear ratio if he attempts to exceed the speed limit, which makes it difficult to use it above this limitation.

2. Establish a system for mechanical locking of the higher gear ratio:
   a. Integrating a second epicyclic train in the mechanism, the ring of which would turn freely in "assisted" functioning and, once braked and once the motors have stopped in "pure pedaling" mode, will actuate the output sprocket via this train.
   b. Integrating a spindle composed of two toothed wheels of different sizes, one of which would be secured to the spindle while the other would be driven by claw coupling. This spindle would connect the sprocket to the bottom bracket with a step-down ratio close to two.
   c. Adding a spindle on a bearing equipped with a toothed wheel on each end and directly connecting the bottom bracket to the output sprocket.

3. Keeping this simplicity of mechanism and using the second motor in generator mode in order to supply the variator motor.

The three solutions will be described one by one below.

The first solution has the advantage of being the simplest and the least expensive, but may deter future acquirers of this type of technology, although a speed above km/h is not very often used on an electric bicycle.

The second solution requires the addition of moving parts applying to the basic mechanism excess weight, complexity and manufacturing cost. However, the mechanism obtained in the end remains advantageous despite these constraints. It should be noted that, for this functioning, a freewheel between the rotor of the first motor and the sun gear has been added, enabling the sun gear to turn more quickly than the rotor.

Figure 13:
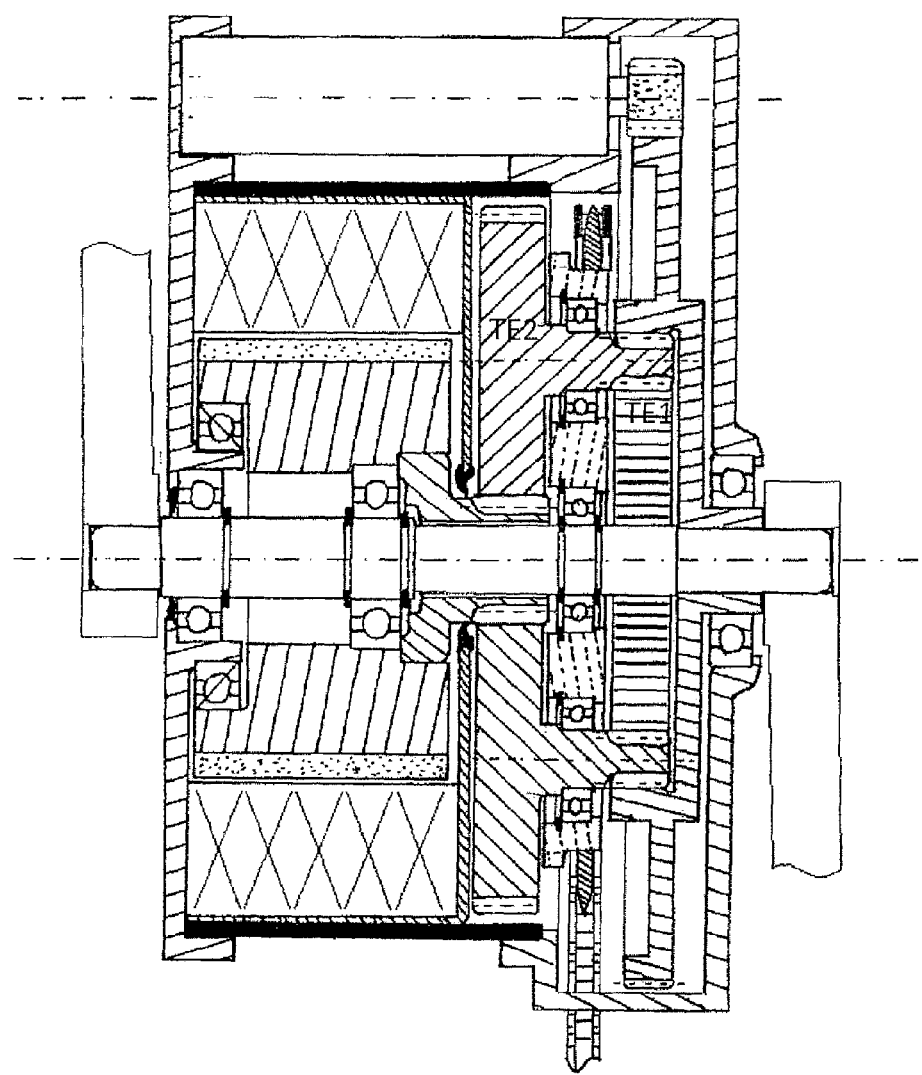
FIG. 13 illustrates another embodiment of a motive power unit according to the present invention.

FIG. 13 illustrates the functioning with option (2a) of the additional epicyclic train. The epicyclic train TE2 is inserted on the same side as TE1. In this configuration, the ring of TE1 (the bottom bracket) is in fact connected to the planet holder of TE2, and the planet holder of TE1 (the sprocket) is linked to the sun gear of TE2. In "assisted" mode, the ring of TE2 rotates in a void. Once the "pure pedaling" mode is triggered, an actuator locks the ring of TE2, the sun gear TE1 this time turns more quickly than the first motor, which is stopped (freewheel between the two) and the bottom bracket by itself drives the output sprocket via a fixed gear ratio dependent on the internal ratio of TE 2.

This solution requires the insertion of an additional epicyclic train, a mechanical locking system (of the brake type) and an additional actuator for fulfilling this single function, which is very little used by the users of electrically assisted bicycles. This configuration also adds a degree of difficulty in manufacture and assembly as well as possible problems of fluid-tightness. Finally, the addition of parts tends to increase the cost, weight and bulk of the mechanism.

According to a third solution, a positive-locking toothed wheel is provided. Compared with the basic mechanism, a spindle and toothed wheels have been added at the top part. The spindle is fixed via bearings in the frame of the motive power unit. The toothed wheel 3a is secured to the spindle and is driven by the ring of TE1 (bottom bracket). Wheel no. 2 turns with the spindle but is free with respect to axial translation. Wheel no. 1 is mounted on a bearing (or needle cage) and is therefore disconnected from its spindle in "assisted" mode. The power coming from the second motor is transmitted to the bottom bracket by means of wheel no. 2 with helical teeth. The axial thrust procured by the helical gearing keeps wheel no. 2 far from no. 1. Once the "pure pedaling" mode is triggered, it is the bottom bracket that drives the first motor and the axial thrust of the helical teeth this time pushes wheel no. 2 towards wheel no. 1, which locks in it. The output sprocket is therefore kept driven directly by the bottom bracket in a reduction ratio particular to the ratio of the number of teeth on wheels no. 1 and no. 3. Compared with solution (a), this second mechanical solution requires few parts and is therefore lighter. This also appears to be less expensive and less complex since it does not require a new actuator. However, there is always a risk related to the sealing of the assembly and the solution risks being more bulky axially.

The motive power unit may also function with a short-circuit spindle. Once engaged, the spindle, equipped with these two toothed wheels, in fact short-circuits the spindle of the bottom bracket and the output sprocket. It is the ratio of the toothed wheels that will impose the imposed mechanical speed. This alternative is the simplest of the three. It is no doubt also the least expensive. The only difficulty lies in the engagement level. Finally, the additional parts tend to increase the cost, weight and bulk of the mechanism.

The third solution requires no addition of supplementary mechanical parts compared with the basic system illustrated in FIGS. 4 to 7. The technique lies here in the power electronics. The principle consists of using the second traction motor as an electrical generator and reinjecting the electricity thus produced into the variator motor. For this solution to function, it is necessary for the mechanical link between the second motor and the bottom bracket to be reversible, and no freewheel will therefore be installed between the two.

The functioning of this system is as follows (FIG. 12). The energy coming from the legs of the cyclist here travels over a dual path. One part directly drives the ring of TE1 while the other drives the sun gear via the second motor and the first motor. The second motor is in fact actuated via the reduction gear, thus producing an electric current supplying the first motor. The second motor will be controlled for braking torque in order to define the energy part passing through this loop and thus define the gear ratio of the global transition. The control of the braking force, and therefore of the electric power supplied, is done electronically by varying the phasing of the magnetic fields in the motor armature. Another advantage of this solution is being able to recover part of the torque for charging the battery in the case of extra effort by the cyclist that would prevent the first motor from keeping the gear ratio engaged. In the same way, it is possible to brake the movement of the bottom bracket when the pedaling movement is resumed after functioning in freewheel at high speed for the time that the first motor resumes its set speed value (in order to recover the gear ratio on which it was before going into freewheel).

The disadvantage of this solution is the low efficiency of the second energy loop. This is because a brushless electric motor having an approximate efficiency of 85% (considering that the efficiency in generator mode is the same), the transmission efficiency of the second energy path is around 72%, thus reducing the global transmission efficiency. This will make the use of the bicycle in "pure pedaling mode" more physical. One way of increasing this transmission efficiency perceived by the cyclist and thus giving him the feeling of running on a "conventional" bicycle is to supply slight energy coming from the battery. The battery will thus compensate for the loss of energy caused by this type of functioning. The result of this is a loss of electrical energy and consequently a loss of range, but this idea is defensible if the percentage of use of the electrically assisted bicycle over and above the speed limitations is taken into account. In addition to this, this idea is very promising since the mechanism remains very simple in design, lightweight, compact and inexpensive to manufacture. This is why this solution has been judged the most advantageous.

One variant of this technology would be to use the second motor as a generator, to send the electricity thus produced to the battery and to supply the variator motor accordingly from the battery. The supply by the battery is in fact of better quality (voltage, rate) and the functioning of the bicycle will be better thereby. This type of scheme amounts identically to the idea explained above but with another path used by the electricity. It will nevertheless be necessary to check that this type of functioning will be accepted with regard to the accreditation of the drive.

Another major advantage of the third solution is that it makes it possible to run it with several gear ratios in "pure pedaling mode" even in the event of failure of the battery or complete discharge, whereas the three variants of the second solution allow only the minimum and maximum ratios of the transmission.

Let us return now to FIGS. 9, 10 and 11 to describe the functioning of the motive power unit according to the invention. Each motor is equipped with its own Hall effect sensor and the angular velocity of each motor thus measured is returned to the control unit. The control unit is also arranged to obtain a measurement of the load torque by measuring the current passing through the stator armature. In "assisted" mode the control unit therefore has available at all times information on torque and angular velocity for the two motors, and this constitutes a considerable advantage. This is because, knowing the speed of the sun gear (the speed of the first motor) and of the ring (the speed of the second motor) of the epicyclic train, the speed of the output sprocket is calculated by the equations disclosed previously and repeated below. Next, solely from knowledge of the torque of the sun gear (the first motor), the torque of the ring (the bottom bracket) and that of the planet holder (the output sprocket) are easily derived by the second equation below.

$$\omega_{plat} = \frac{\omega_{MVpl} + R\omega_{ped}}{R+1}$$

$$C_{MV} = \frac{C_{ped}}{R} = \frac{C_{plat}}{R+1}$$

It is therefore possible to have the information on the torque applied to the pedals by the cyclist, denoted $C_{Homme}$, by means of the following equation:

$$C_{Homme} = C_{ped} - C_{MT}^{mes} = R \cdot C_{MV}^{mes} - C_{MT}^{mes}$$

The control unit thus regulates the torque of the first motor by means of the regulation loop.

The information on the torque of the cyclist is therefore recovered by the measurements of torque supplied by the two motors. A last item of information is necessary for control of the motive power unit, namely that supplied by a speed sensor installed on the front wheel or rear wheel. This is because the speed of the rear wheel may be different from the speed of the wheel pinion when the bicycle is said to be "in freewheel". It is then necessary to know the exact speed of the bicycle in order to know whether or not the assistance may be triggered.

The principal role of the first motor is to offer the required transmission ratio, as described above. The first motor is therefore regulated in order to follow a set speed point. This set point is in fact the coefficient "a" divided by the reduction ratio of the second motor and then multiplied by the speed measurement of the Hall effect sensor equipping the second motor.

$$\omega_{MV}^{cons} = a \cdot \omega_{ped} = \frac{a}{R_{MT}} \cdot \omega_{MT}^{mes}$$

Depending on whether the drive is in "automatic" or "manual" mode, the coefficient "a" will be imposed by the control unit or by the cyclist himself. These two methods of managing the speeds will be disclosed below.

The second traction motor will provide the missing power in order to comply with the required assistance level "NivAssist". This motor will therefore act in particular on the low gear ratios (the first motor giving little power to the wheel for this functioning) and its power will be attenuated as the multiplying coefficient "a" increases. For information, the assistance level is defined as the ratio between the electric power supplied and the total power on the output sprocket of the drive. It is characterised in assisted mode by the following equation:

$$NivAssist = \frac{a + \frac{R_{MT} C_{MT}}{C_{MV}}}{a + R}$$

The speed-multiplying coefficient "a" is either chosen by the cyclist or calculated by the automatic gear change algorithm. R and $R_{SECOND\ MOTOR}$ are fixed dimensional values particular to the gears. $C_{MV}$ can be measured by the control unit (measurement of intensity). In order to have the required assistance level, it therefore suffices to control the torque of the second motor. The traction motor will therefore be regulated so as to follow the set torque value:

$$C_{MT}^{cons} = \frac{C_{MV}^{mes} \cdot (NivAssist \cdot (a + R) - a)}{R_{MT}}$$

The control unit will therefore have to integrate a regulation loop (FIG. 11) regulating the torque of the second motor. It should be noted that the set torque value of the first motor may be either positive or negative. In the case where this is negative, the first motor will function in generator mode and will thus charge the battery.

Figure 14:
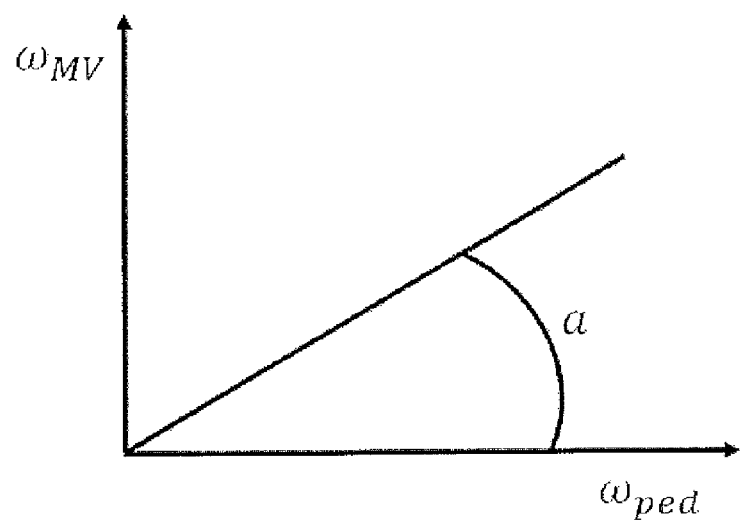
FIG. 14 illustrates the relationship between the pedaling angular velocity and the angular velocity of the first motor.

As described previously, the gear ratio change is done via the control of the multiplying coefficient "a". The minimum value of a is zero, which corresponds to the first mechanical gear ratio when the freewheel connecting the sun gear to the bottom-bracket shell is locked. By increasing the coefficient a, the step down seen from the bottom bracket increases. This may also be seen graphically (FIG. 14), and the coefficient a is in fact the slope of the angular velocity of the first motor.

$$\omega_{MV} = a \cdot \omega_{ped}$$

Figure 15:
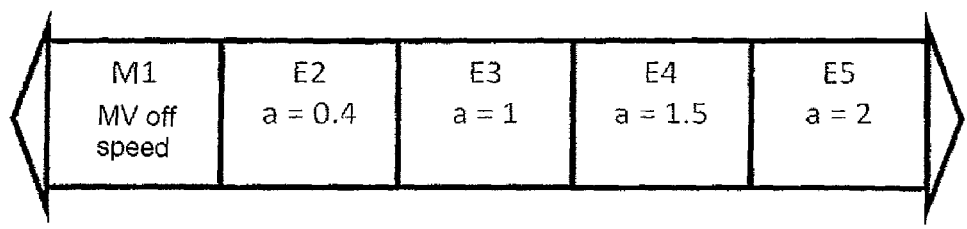
FIGS. 15 to 17 illustrate the gear ratios.

Technically speaking, the motive power unit would be equipped with a small electronic box composed of two electronic buttons, fixed to the handlebars of the bicycle, and returning the information from the control unit via electric wires (or optionally wireless technology). One of the two buttons serves to increase the speed and the other to decrease. The drive system therefore acts as a sequential electronic box. A number of discrete ratios, each corresponding to a value of the coefficient a, would therefore be embedded in the computer managing the drive. By pressing on the "+" button the control unit changes from one value of "a" to the following higher one. By pressing on "−", the control unit passes to a lower value of "a". This functioning is illustrated by the example set out in FIG. 15. The drive includes five discrete ratios. The first speed corresponds to a=0 and the 5$^{th}$ corresponds for example to the maximum ratio or a=2. These figures are however not representative of the final sizing. The intermediate ratios are for example: a=0.4, a=1 and a=1.5. In this case the organisation of the speed is represented in this way. The index M signifies that the ratio is "mechanical" and the index E signifies that the ratio is electrical.

If a cyclist, starting from rest, begins to accelerate to the speed of 25 km/h, he will successively change ratios up to the last. In passing through the ratios, he increases the value of a in the control unit.

The advantage of this manual version is to offer the cyclist the possibility of adapting these ratios as he wishes just like a bicycle with a derailleur while offering high ratio change quality. This is because, with this system, the gear changes can be done on the go (double click, triple click), under torque and even at rest. In addition, the control of the speeds is here electronic rather than mechanical, which offers increased ease of pressing on the commands and offers great robustness for the system. There is neither any adjustment to (re)make, nor wear, nor risk of breakdown (breakage of the metal cable). In summary, there is an enormous gain in ease of use of the gears.

Figure 16:
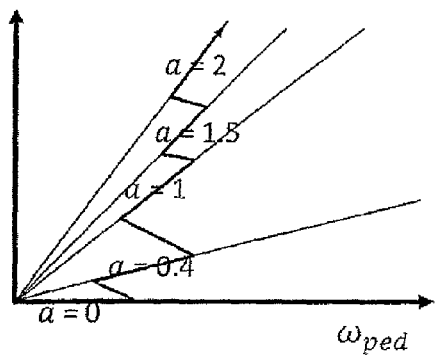

In a version with automatic gear change, it is no longer the cyclist who decides on the value of the coefficient "a" to be sent to the control unit. The coefficient "a" is now calculated by the control unit itself according to certain parameters. A ratio change cartography is then installed in the control unit (as with the control for automobile automatic boxes). The cartography will give the value of "a" to be applied according to two parameters: the speed of the bicycle and the torque on the bottom bracket. A cartography is given by way of example in FIG. 16. The diagram in FIG. 16 depicts an example of "rising" laws in thick black and "retrograde" laws in thin black, which indicates the sites of up and down changes of the gears (and therefore of the coefficient "a") for a three-speed gearbox.

Figure 17:
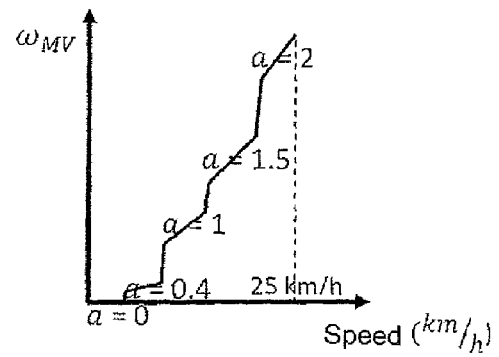

For the automatic version, it will be possible to increase the number of available ratios infinitely in order to obtain a continuously variable transmission, also referred to as "CVT". This means that, instead of having a finite number of discrete ratios, the drive would change the multiplying coefficient "a" continuously. The graphical representation is in FIG. 17. The advantage of the automatic version is the very simplicity of the system to be installed since a speed control box is no longer necessary. This also releases space on the handlebars and gives a purer style to the bicycle. This type of control would be rather suited to persons requiring high running comfort.

Figure 18:
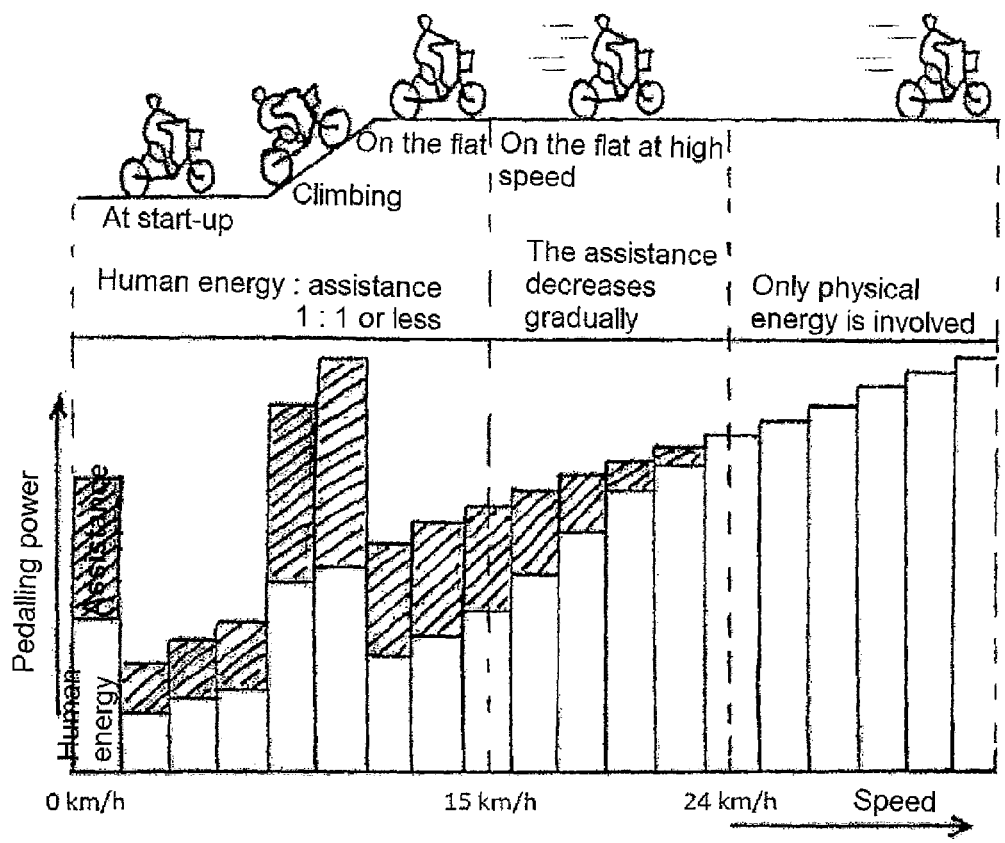
FIG. 18 shows schematically the assistance provided to the cyclist.

The ways of controlling the first variator motor 5 and the second traction motor 4 in normal mode ("assisted" mode) will now be described. FIG. 18 illustrates the assistance supplied according to the terrain on which the cyclist is travelling. The take-off signifies the start-up of the bicycle from rest. The assistance is triggered as soon as the speed of the bottom bracket reaches a certain threshold. At this moment, the information about the torque on the bottom bracket is available via the formula set out above. The control unit is therefore arranged to calculate the set torque value to be applied to the second motor and the second motor thus starts up. On the smallest gear ratio, the first motor is powered down, whereas on all the other ratios it is running. The two motors are now regulated as explained previously.

For the assistance to be reactive, it is preferably necessary for the control unit to receive the speed information from the first motor with a short response time. For this purpose, it is preferable for the resolution of the angular sensor to be fine. There should not be any problem with regard to this since the pedal and the second motor are separated by a gearbox having a ratio of around 20, which means that the second motor will have made one turn when the bottom bracket has made only a twentieth of a turn. If three changes of state of the Hall effect sensor per turn of the second motor are counted, this gives us a resolution of 6 degrees on the bottom bracket, which should suffice.

If however there were to be an excessively slow reactivity of the electric assistance on start-up, the solution consists of modifying the freewheel serving to lock the sun gear when the first motor is powered down. This freewheel would be free to rotate (by 1 or 2 degrees) in the frame of the bottom-bracket shell and a switch with a spring would be inserted in this clearance. When the cyclist pushes on the pedal to move his bicycle, the sun gear will have a tendency to want to turn in the opposite direction and will press against the switch, which will initiate the running of the first motor and second motor.

Whether the gear change is manual or automatic, as soon as the coefficient "a" changes, the set value of the first motor is thus modified and the first motor changes its speed. It is possible for the manual mode to impose acceleration/deceleration ramps in order to obtain a linear and smooth gear change. Like the majority of electrically assisted bicycles, the motive power unit is accompanied by switches installed in the brake handles. As soon as the control unit receives the braking information, it switches off the two electric motors.

When the torque of the cyclist measured goes below a certain threshold, the second motor is switched off. The first motor reduces its speed since it is linked to the pedaling speed via the multiplying coefficient "a". If the cyclist pedals backwards, operating the freewheel of the rear pinion of the bicycle, the first motor is switched off.

Everything resumes just like start-up since all the parts of the epicyclic train are stopped before the cyclist recommences making an effort on the pedals. The belt (or chain) does not turn because of the freewheel placed in the rear pinion (as with a conventional bicycle). As soon as a speed measurement of the bottom bracket is captured, the first motor starts up (if the gear ratio differs from the smallest one) following the set speed value imposed by the gear ratio triggered. The regulation loop of the second motor is also reactivated.

Pure pedaling can be practiced in situations where the battery is discharged or faulty. In this case the cyclist moves his bicycle by pedaling simply. His bicycle will first of all be on the first mechanical gear ratio (freewheel of the sun gear locked against the frame). The following ratios are changed either manually or automatically. The energy necessary for supplying the first motor so that its set speed value follows will be taken by the second motor, thus functioning in generator mode. Its braking torque being controlled by the phasing of the switching of the command.

When the cyclist approaches the speed limit in "assisted" mode, the drive first of all gradually reduces its assistance level in order then to go to zero when the bicycle arrives precisely at this limit. As from this moment, everything happens like functioning in "pure pedaling" apart from the fact that the battery can supply the first motor partly with a power less than or equal to that lost in the "second motor generator" functioning. The battery still being charged, it is possible to compensate for the losses incurred by the functioning of the drive in this precise case. In this manner, all the energy supplied by the cyclist goes to the road (with the exception of friction incurred by the transmission of course).

Figure 19:
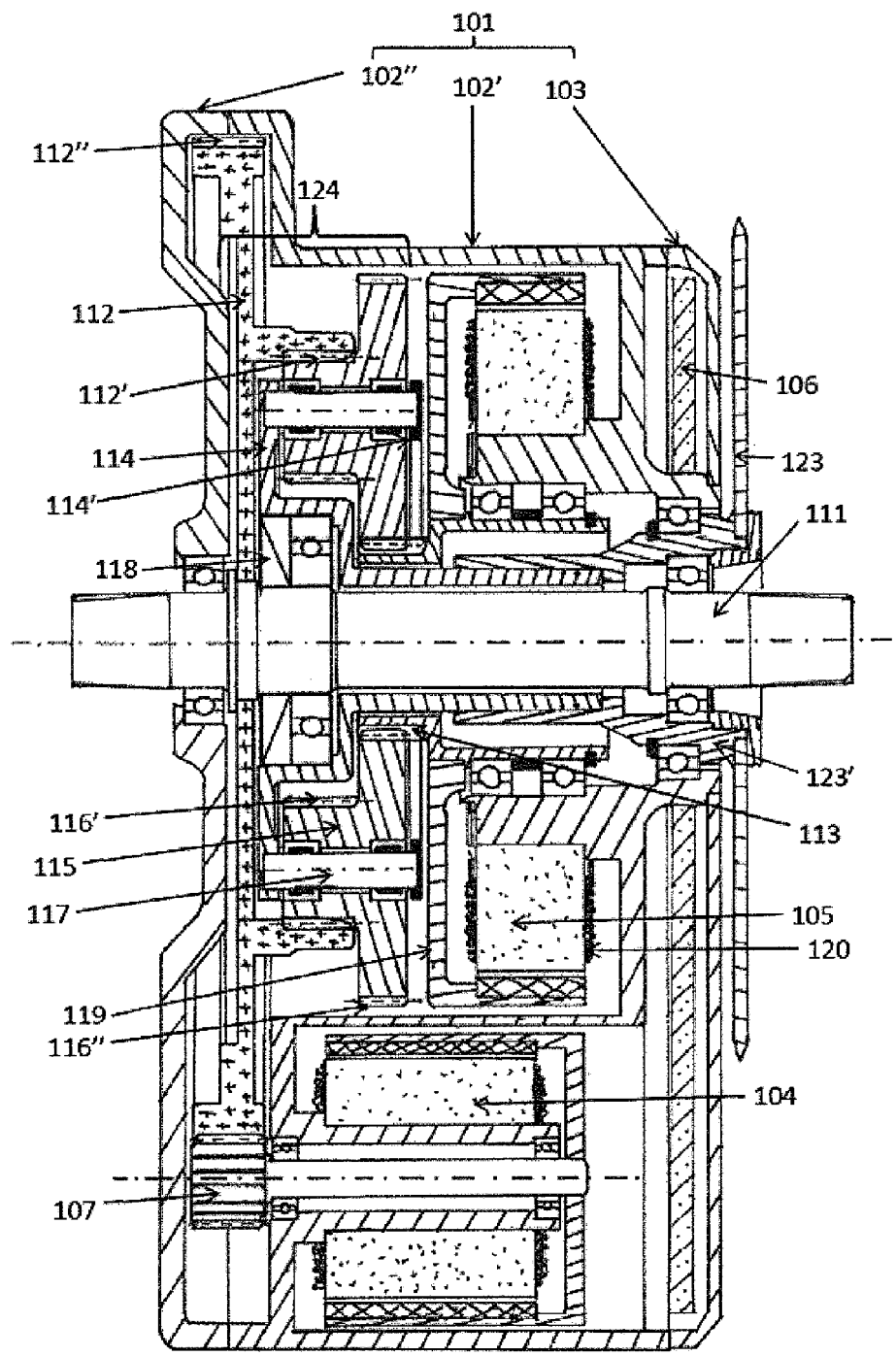
FIG. 19 illustrates another embodiment of the motive power unit according to the invention.

FIG. 19 illustrates another embodiment of the motive power unit according to the invention. In this embodiment all the components of the motive power unit are situated inside a closed housing 101 independent of the bicycle frame. The housing 101 consists of three parts connected together, namely the right-hand casing 102', the left-hand casing 102" and the cover 103. The housing 101 is fixed to the bicycle frame by means of fixings, for example formed by fixing screws. Where applicable the bicycle frame will be adapted or designed so as to fix the housing thereto. The housing 101 contains the bottom-bracket spindle 111 at its centre, the two electric motors 104 and 105 and the electronic control circuit 106.

The first motor 105 comprises a stator 120 mounted coaxially with respect to a rotor 119. The wound stator 120 is fixed to the right-hand casing 102'. The first motor is connected to a sun gear 113, forming part of an epicyclic train 124. The epicyclic train is composed of three independent parts, namely the sun gear 113, the planet holder 114 and the ring 112. The sun gear preferably being mounted integrally with the rotor 119 of the first motor 105. The epicyclic train also comprises a set of double planets 115. Each double planet 115 consists of two toothed wheels, fixed to each other and preferentially of different sizes. The smallest toothed wheel is referred to as the "small planet" 116' and the largest toothed wheel is called the "large planet" 116". Preferably, there will be three double planets 115, since this affords good balance between the moving parts and the weight of the epicyclic train. Each double planet 115 is mounted on a planet spindle 117 by means of one or two bearings. The planet spindle 117 is preferentially fixed by both ends to the planet holder 114 on one side and to the reinforcing plate of the planet holder 114' on the other side. The sun gear meshes with the large planets 116" in order to increase the rotation speed of the planet holder 114. This is because the rotation speed of the planet holder 114 is a linear relationship of the rotation speeds of the ring 112 and the sun gear 113. The output sprocket 123 is secured to the planet holder 114. A hollow output spindle 123', mounted coaxially around the bottom-bracket spindle 111, transmits the torque coming from the planet holder 114, situated on the left-hand side, to the output sprocket, situated on the right-hand side of the housing 101. The output sprocket 123 is used to mount thereon a chain or a notched belt, which serves in its turn to drive the pinion of the rear wheel of the bicycle. The small planets 116' mesh with the internal teeth 112' on the ring 112, themselves forming part of the epicyclic train. External teeth 112", integral with the ring 112, mesh with the second motor 104, which for this purpose is provided with a drive pinion 107. The transmission between the drive pinion 107 and the ring is closed sealingly with the left-hand casing 102". The bottom-bracket spindle 111 is secured to the ring 112 of the epicyclic train, for example by means of flutes, not shown in the drawing. Naturally other systems for locking with respect to rotation can be provided to secure the bottom-bracket spindle and the ring.

The rotor 119 of the first motor 105 is guided by one or two bearings housed in the right-hand casing 102'. A bottom-bracket spindle 111 passing through the epicyclic train and the output spindle is supported by two bearings. On the right, the bearing is connected to the output spindle 123'. On the left, the bearing is housed in the housing 101. The output spindle 123' and the planet holder 114 are assembled to form a rigid assembly guided by two bearings. On the right, the bearing is housed in the housing 101. On the left, it is a bearing equipped with a freewheel 118 and connected to the bottom-bracket spindle 111, preventing the planet holder 114 from turning less quickly than the bottom-bracket spindle 111. The freewheel 118 forces the rotor 119 of the first motor 105 to turn at the same speed as the bottom-bracket spindle if this first motor is not supplied. Thus the two inputs of the epicyclic train turn at the same speed, and turn the output sprocket at this same speed (by virtue of the kinematic equations of an epicyclic train). This arrangement makes it possible to keep a torque transmission should the first motor 106 be overloaded or in the event of breakdown of the control system.

The invention claimed is:

1. Motive power unit for a pedal vehicle, in particular a bicycle, said motive power unit comprising a first and second motor as well as an epicyclic train having a planet holder, a ring and a sun gear, said first motor being connected to the epicyclic train, said motive power unit also comprising a bottom-bracket spindle to which the ring is connected in order to form a first input of the epicyclic train, characterised in that the second motor is meshed on the bottom-bracket spindle and the first motor is connected to the sun gear, the planet holder being connected to an output sprocket of the motive power unit, said first and respectively second motors being provided with a first and respectively a second sensor arranged to measure the angular velocity of the motor with which it is associated, said first and second sensors being connected to a control unit to which there is also connected a third sensor arranged to measure the speed at which the bicycle is being propelled by a cyclist, said motive power unit comprising a measuring element arranged to produce a measurement signal indicating a torque supplied by the first motor, said control unit being arranged to produce a first and second control signal on the basis of the speeds measured by the sensors and predetermined set values as well as the measurement signal indicating the torque, said first control signal being a rotation speed control signal that is supplied to the first motor, said second control signal being a torque control signal that is supplied to the second motor.

2. Motive power unit according to claim 1, characterised in that the control unit comprises an input for receiving a gear ratio signal indicating a gear ratio selected by the cyclist from a predetermined number of gear ratios, said control unit being arranged to produce said first control signal also as a function of the gear ratio signal received.

3. Motive power unit according to claim 1, characterised in that it comprises a third sensor connected to the control unit and arranged to measure the speed at which the bicycle is being propelled by a cyclist, the control unit being arranged to produce, on the basis of the measured speed, a gear ratio signal indicating a gear ratio selected from a predetermined number of gear ratios, said control unit being arranged to produce said first control signal also according to the gear ratio signal received.

4. Motive power unit according to claim 2, characterised in that the control unit is arranged to produce a weighted signal obtained by multiplication of the measured angular velocity of the second motor with a weighting signal obtained from the gear ratio signal received weighted by a reduction ratio of the second motor, and to produce said first control signal by means of the weighted signal.

5. Motive power unit according to claim 2, characterised in that the control unit is arranged to compare the first control signal with the measured angular velocity of the first motor and to adjust the first signal according to a difference established during this comparison in order to maintain the angular velocity of the first motor at that imposed by the first control signal.

6. Motive power unit according to claim 1, characterised in that the control unit is arranged to produce the second control signal according to an assistance level selected by the cyclist.

7. Motive power unit according to claim 1, characterised in that the epicyclic train comprises a first set of small planets mounted so as to be driven by the ring, said first set of small planets being mounted on the planet holder, said first set of small planets being connected to a second set of large planets meshed on the sun gear.

8. Motive power unit according to claim 7, characterised in that the small and large planets are fixed to the same planet spindle.

9. Motive power unit according to claim 1, characterised in that the rotor of the first motor is mounted by means of a freewheel on a chassis of the motive power unit so as to prevent the rotor from turning in the opposite direction to the predetermined direction of rotation of the first motor.

10. Motive power unit according to claim 1, characterised in that the rotor of the first motor is fixed on a bearing to the bottom-bracket spindle.

11. Motive power unit according to claim 1, characterised in that the second motor is meshed on the bottom-bracket spindle by means of a reception wheel.

12. Motive power unit according to claim 1, characterised in that the rotor of the first motor is fixed to the sun gear.

13. Motive power unit according to claim 1, characterised in that the first and second motors are electric motors of the brushless type.

14. Motive power unit according to claim 1, characterised in that the control unit, the first motor and the epicyclic train are mounted in the same housing.

15. Motive power unit according to claim 1, characterised in that the planet holder is mounted by means of a freewheel on the bottom-bracket spindle so as to prevent the planet holder from turning less quickly than the spindle of the bottom bracket.

16. Bicycle equipped with a motive power unit according to claim 1.

17. Bicycle according to claim 16, characterised in that the first motor and the epicyclic train are mounted in the bottom-bracket shell of the bicycle.

\* \* \* \* \*